July 22, 1924.
E. H. WEBB
FRICTION CLUTCH
Filed Feb. 4, 1922
1,501,978
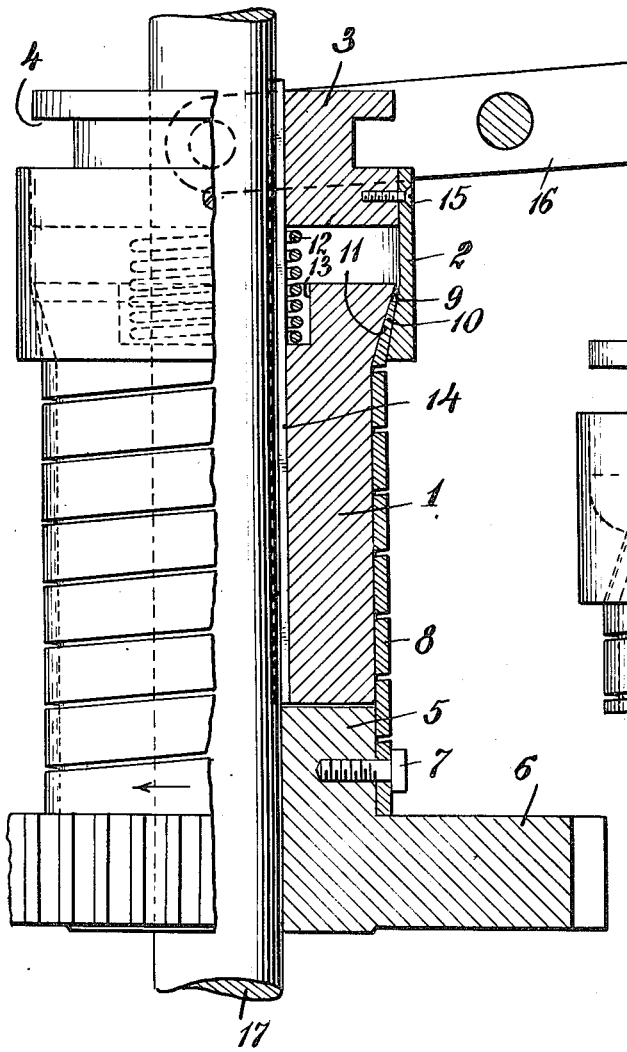
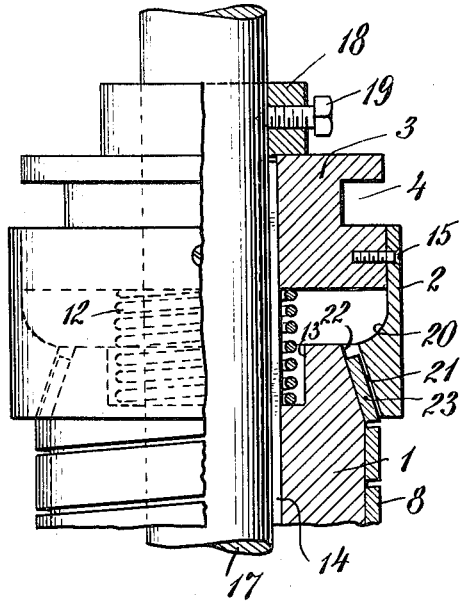
INVENTOR.
Ernest H. Webb
BY
Harry L. Duncan
ATTORNEY.

Patented July 22, 1924.

1,501,978

UNITED STATES PATENT OFFICE.

ERNEST H. WEBB, OF NEW BRUNSWICK, NEW JERSEY, ASSIGNOR TO THE WEBB WIRE WORKS, OF NEW BRUNSWICK, NEW JERSEY, A CORPORATION OF NEW JERSEY.

FRICTION CLUTCH.

Application filed February 4, 1922. Serial No. 534,077.

*To all whom it may concern:*

Be it known that I, ERNEST H. WEBB, a citizen of the United States, and resident of New Brunswick, Middlesex County, New Jersey, have made a certain new and useful Invention Relating to Friction Clutches, of which the following is a specification taken in connection with the accompanying drawing, which forms part of same.

This invention relates especially to friction clutches of the coil type in which the resilient clutching coil is formed with a conical or wedging actuating collar which may be integral with the thin or more yielding actuating end of the coil, the other end of which may be secured as by an integral collar to the driving member of the clutch. The driven clutch member, which may comprise a drum within the clutch coil, may have an upwardly flaring conical wedging end cooperating with the actuating collar on the clutching coil but normally free from substantial engagement therewith or at least only in light or occasional friction engagement. A conical actuating flange can be provided outside of the actuating collar on the coil so that by moving this flange longitudinally it can be brought into wedging engagement with the actuating collar and force the latter into strong frictional engagement with the wedging end of the drum inside. This strong frictional engagement of course causes the adjacent coils to contract so that they successively grip the drum and prevent slipping under normal operating conditions while when released, the resilience of the coil causes it to expand sufficiently to move out of substantial contact with the drum and, if desired, it may be supported in this position by an external support or cylindrical casing which may be connected with the actuating collar or the other end of the clutching coil, if desired.

In the accompanying drawing showing in a somewhat diagrammatic way various illustrative embodiments of the invention—

Fig. 1 is a partial vertical section through one form of clutch, and

Fig. 2 is a similar detail view showing a modification.

The driving member or gear 6 may be mounted to revolve loosely about the driven shaft 17 and may be supported in any suitable bearings. This driving member may have a cylindrical projection or upwardly extending portion 5 to which the securing collar or integral end of the clutching coil 8 may be securely fastened in any suitable way as by the bolts or screws 7. This helical clutching coil may be formed of a single piece of resilient material of such size as to be normally slightly out of contact with the clutch drum 1, secured to the driven shaft as by the tight fitting key 14. A convenient way of forming the clutching coil is to mill out or form the same from a tubular piece of resilient steel, brass or bronze stock, so that the turns of the coil are separate except at the ends which are preferably left continuous to prevent deformation and to secure better cooperation with the adjacent elements. This coil is preferably provided at its free end with a conical actuating collar 10 which may be spun or forced out and suitably finished so as to properly engage the cooperating elements such as the upwardly flaring conical wedging end 11 of the clutch drum.

Any suitable actuating means may be employed to force this actuating collar into engagement with the clutch drum or to prevent its rotation when the clutch is to be actuated and for this purpose a conical actuating flange 9 may be formed on the actuating member 2, secured as by the screws 15 to the clutch shifter collar 3. This may be loosely keyed or splined on the driven shaft and provided with an annular recess 4 to be engaged by the usual yoke on the shifter lever 16. This shifter lever may be normally secured in such position as to hold the shifter collar and connected actuating flange in their lower inoperative positions so that the flange is out of engagement with the actuating collar on the clutching coil. This coil can, therefore, resiliently expand out of engagement with the clutch drum 1 and this action also tends to withdraw the actuating collar or conical end 10 of the coil from engagement with the conical end 11 at the upper part of the drum. When the clutch is to be operated, however, the shifter collar is moved upward as by movement of the shifter lever 16 or this lever may be released and the parts moved by the clutch actuating spring 12 having its lower end seated in the spring recess 13 in the clutch drum. When the actuating flange 9 is moved upward so as to frictionally engage the conical actuating collar 10 on the clutching coil the rotation of this coil end is retarded and it can also be forced into frictional engagement with the conical or wedging drum end 11 which further retards this end of the clutching coil and causes its adjacent turns to wind up sufficiently so that they contract and engage the clutch drum within. This frictional engagement, of course, progressively increases from one turn to another of the clutching coil so that a relatively slight frictional engagement with the actuating collar which is just sufficient to overcome the resilient expansion of the turns of the coil ensures the powerful and reliable clutching engagement between the coil and the clutch drum and connected driven shaft or other member. For this reason the clutch has proved highly desirable even under the severe service conditions of wire drawing. The clutch also readily releases itself through the resilient expansion of the clutching coil as soon as the actuating collar on this coil is released from the cooperating actuating flange by downward movement of the flange.

Another arrangement is shown in Fig. 2 as comprising a contracting conical wedging end 22 on the clutch drum 1 with which the continuous or other integral actuating collar 23 on the upper end of the clutching coil 8 cooperates. The shifter collar 3 in this instance may have secured thereto a wedging actuating flange 21 on the inner face of the member 20 so that when the shifter collar is forced downward against the disengaging pressure of the releasing spring 12 in this instance the actuating collar 23 is thus retarded and simultaneously forced into engagement with the wedging end on the clutch drum so as to secure somewhat similar engaging and releasing action of the resilient clutching coil. If desired, a stop flange or adjustable collar 18 may be secured on the shaft 17 as by the set screw 19 so as to limit the upward movement of the shifter collar.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims:

1. In friction clutches, a substantially vertical driven shaft having a clutch drum tightly keyed thereto, a cooperating driving member having secured thereto a resilient helical clutching coil provided on its free upper end with a conical actuating collar adapted to cooperate with an upwardly flaring conical wedging end on said clutch drum, a shifter collar loosely keyed on said driven shaft and normally pressed upward by an actuating spring arranged in a spring recess in said clutch drum and a conical actuating flange secured to said shifter collar and adapted to cooperate with the actuating collar on said clutching coil to retard and force the same into frictional engagement with the end of said clutch drum and cause progressive contraction and frictional engagement between the turns of the clutching coil and the drum.

2. In friction clutches, a substantially vertical driven shaft having a connected clutch drum, a cooperating driving member having secured thereto a resilient helical clutching coil provided on its free upper end with an upwardly flaring conical actuating collar adapted to cooperate with an upwardly flaring conical wedging end on said clutch drum, a shifter collar loosely keyed on said driven shaft and normally pressed upward by an actuating spring and an upwardly flaring conical actuating flange secured to said shifter collar and adapted to cooperate with the actuating collar on said clutching coil to cause progressive contraction and frictional engagement between the turns of the clutching coil and the drum.

3. In friction clutches, a substantially vertical driven shaft having a connected clutch drum, a cooperating driving member having secured thereto a resilient helical clutching coil provided with an upwardly flaring conical actuating collar on its free end adapted to cooperate with a flaring conical wedging end on said clutch drum, a shifter collar slidingly mounted with respect to said driven shaft and normally engaged by an actuating spring and a conical actuating member secured to said shifter collar and adapted to cooperate with the actuating collar on said clutching coil to retard the same and cause progressive contraction and frictional engagement between the turns of the clutching coil and the drum.

4. In friction clutches, a substantially vertical driven shaft having a connected clutch drum, a cooperating driving member having secured thereto a resilient helical clutching coil provided with a continuous conical actuating collar on its free end, a shifter collar slidingly mounted with respect to said driven shaft and a conical actuating member secured to said shifter collar and adapted to cooperate with the actuating collar on said clutching coil to cause progressive contraction and frictional engagement between the turns of the clutching coil and the drum.

5. In friction clutches, a driven shaft having a connected clutch drum, a cooperating driving member having secured thereto a resilient helical clutching coil provided with a continuous conical actuating portion on its free end, and a movable spring operated actuating member adapted to cooperate with the actuating portion of said clutching coil to retard the same and cause progressive contraction and frictional engagement between the turns of the clutching coil and the drum.

6. In friction clutches, a driven shaft having a connected clutch drum, a cooperating driving member having secured thereto a clutching coil provided with a continuous conical actuating portion and a movable actuating member adapted to cooperate with the actuating portion of said clutching coil to retard the same and cause progressive contraction and frictional engagement between the turns of the clutching coil and the drum.

7. In friction clutches, a clutch drum having a conical actuating element, a cooperating driving member having secured thereto a resilient helical clutching coil provided with a continuous conical actuating portion adapted to cooperate with said actuating element on said clutch drum, and an actuating member having sliding movement relative to said drum and adapted to cooperate with the actuating portion of said clutching coil to cause frictional clutching engagement between the turns of the clutching coil and the drum.

8. In friction clutches, a driven shaft having a connected clutch drum formed with a cylindrical body and an outwardly flaring conical actuating element, a cooperating helical clutching coil provided with a cylindrical body and a continuous outwardly flaring conical actuating portion on its free end, and a movable spring operated actuating member having a conical actuating portion adapted to cooperate with said conical actuating element and positively grip the actuating portion of said clutching coil to retard the same and cause progressive contraction and frictional engagement between the turns of the clutching coil and the drum.

9. In friction clutches, a driven shaft having a connected clutch drum formed with a cylindrical body and conical actuating element, a cooperating driving member having secured thereto a resilient helical clutching coil provided with a cylindrical body and a conical actuating portion on its free end, and a movable actuating member having a conical actuating portion adapted to cooperate with said conical actuating element and positively grip the actuating portion of said clutching coil to cause progressive contraction and frictional engagement between the turns of the clutching coil and the drum.

10. In friction clutches, a substantially vertical clutch drum, a cooperating driving member having secured thereto a resilient helical clutching coil provided with a continuous conical actuating collar adjacent its free upper end, and a spring operated conical actuating member having sliding movement relative to said clutch drum and adapted to cooperate with the actuating collar on said clutching coil to cause frictional clutching engagement between the turns of the clutching coil and the drum.

11. In friction clutches, a clutch drum, a cooperating clutch member having secured thereto a resilient helical clutching coil provided with a continuous conical actuating collar and an actuating member adapted to cooperate with the actuating collar on said clutching coil to cause frictional clutching engagement between the turns of the clutching coil and the drum.

12. In friction clutches, a driven shaft having a connected clutch drum, a cooperating driving member having secured thereto a resilient helical clutching coil provided with a body and an outwardly flaring conical actuating portion on its free end and normally out of contact with said clutch drum when the clutch is disengaged, and a movable actuating member having a conical actuating portion adapted to cooperate with the actuating portion of said clutching coil to cause progressive contraction and frictional engagement between the turns of the clutching coil and the drum.

ERNEST H. WEBB.